United States Patent
Yang

(10) Patent No.: US 8,574,769 B2
(45) Date of Patent: Nov. 5, 2013

(54) MANUFACTURING METHOD FOR POLYIMIDE SEPARATOR

(75) Inventor: Szu-Nan Yang, Taipei (TW)

(73) Assignees: Prologium Technology Co., Ltd., New Taipei (TW); Prologium Holding Inc., Grand Cayman (KY)

(*) Notice: Subject to any disclaimer, the term of this patent is extended or adjusted under 35 U.S.C. 154(b) by 1015 days.

(21) Appl. No.: 12/104,033

(22) Filed: Apr. 16, 2008

(65) Prior Publication Data

US 2008/0261106 A1 Oct. 23, 2008

(30) Foreign Application Priority Data

Apr. 20, 2007 (TW) .............................. 96114129 A

(51) Int. Cl.
*H01M 2/14* (2006.01)
*H01M 2/16* (2006.01)
*H01M 2/18* (2006.01)
*B05D 5/12* (2006.01)

(52) U.S. Cl.
USPC ........... 429/253; 429/129; 429/142; 429/144; 429/247; 429/249; 429/251; 427/58

(58) Field of Classification Search
USPC ......... 429/142, 129, 144, 247, 249, 251, 253; 427/58
See application file for complete search history.

(56) References Cited

U.S. PATENT DOCUMENTS

| | | | | |
|---|---|---|---|---|
| 4,721,732 A | * | 1/1988 | Dubrow et al. | 521/62 |
| 6,565,763 B1 | * | 5/2003 | Asakawa et al. | 216/56 |
| 2005/0186479 A1 | * | 8/2005 | Totsuka et al. | 429/251 |
| 2006/0051663 A1 | * | 3/2006 | Fujita et al. | 429/142 |
| 2008/0076009 A1 | * | 3/2008 | Saito et al. | 429/41 |

* cited by examiner

*Primary Examiner* — Sean P Cullen
(74) *Attorney, Agent, or Firm* — Muncy, Geissler, Olds & Lowe, PLLC

(57) ABSTRACT

A separator includes a separator body and a first film. The separator body is formed by mixing and solidifying a first material and a second material and then removing the first material by an alkaline liquid etching process. The separator body has a plurality of irregular holes formed corresponding to the removed first material. The first film is disposed on one side of the separator body.

10 Claims, 5 Drawing Sheets

MANUFACTURING METHOD FOR POLYIMIDE SEPARATOR

CROSS REFERENCE TO RELATED APPLICATIONS

This Non-provisional application claims priority under 35 U.S.C. §119(a) on Patent Application No(s). 096114129 filed in Taiwan, Republic of China on Apr. 20, 2007, the entire contents of which are hereby incorporated by reference.

BACKGROUND OF THE INVENTION

1. Field of Invention

The invention relates to an electricity element, a separator thereof and a manufacturing method of the separator.

2. Related Art 3C products, such as electronic, information and communication devices, are gradually developed toward the wireless and mobile directions. Various high-performance elements used in various products have to be developed toward miniaturization. In addition, the development of the flexible electronic product has also been gradually emphasized in the recent years. Thus, the need of the battery having small size, light weight and high energy density is very urgent.

Regarding to the usage property of the battery system, a conventional primary battery system, which cannot be repeatedly used, cannot satisfy the requirement of the modern electronic product in order to lengthen the using time and increasing the energy density of the battery. The mainstreams in the battery systems applied to the electronic products are now the secondary battery systems, which can be charged and discharged repeatedly. The secondary battery systems include, for example, a lithium battery system, a fuel cell system, a solar cell system, and the likes. However, under the development of the modern technology, the fuel cell system still encounters the limitation of the minimum size, and the solar cell system cannot obtain the ideal energy conversion efficiency due to the limitation of the material. Therefore, the lithium battery system among the secondary battery systems is well developed and can achieve the requirements of the small size and high energy density.

The battery core structure of the lithium battery is gradually developed from the stacked structure to the wired structure. The main structure of the battery core in either the stacked structure or the wired structure includes an anode plate, a cathode plate and a separator interposed therebetween. Referring to FIG. 1, a conventional battery 1 includes a separator 11, a first current collecting layer 12, a second current collecting layer 13, a first active material layer 14, a second active material layer 15 and a package unit 16. The separator 11 has a separator body 110, a first film 111 and a second film 112. Alternatively, the separator 11 can be composed of the separator body 110 only. The separator 11 mainly prevents a first electrode substrate, which includes the first current collecting layer 12 and the first active material layer 14, from directly contacting with a second electrode substrate, which includes the second current collecting layer 13 and the second active material layer 15. The configuration of the separator 11 is to prevent the short-circuited condition in the battery 1 and to provide the path for ion migration in the battery 1. Therefore, the material of the separator body 110 of the separator 11 must have the non-electrical conductive and porous properties. The separator body 110 is usually made of a polymeric material, such as polyethylene or polypropylene, and the holes of the separator body 110 are usually formed by non-solvent system or mechanical uniaxial tension technology.

The structure of the local polymer can be transformed within a predetermined temperature range according to softening temperatures (about 100 to 150° C.) of different polymers or the same polymer with different molecular weights. Thus, when the battery system has the internal short-circuited condition, the external short-circuited condition or any factor, which causes the rise of its internal temperature, the path for the ion migration in the battery 1 can be closed due to the structure transformation of the separator body 110 and films 111, 112 of the separator 11. Accordingly, the battery 1 can be prevented from continuing the electrochemical reaction at the high temperature so as to decrease the possibility of the explosion of the battery 1.

However, if the temperature of the battery 1 continuously rises up to 150 to 180° C., the separator 11 may melt and break down to cause the overall short-circuited conditions and thus the seriously firing or exploding condition Therefore, it is an important subject to provide a separator capable of withstanding high temperature.

SUMMARY OF THE INVENTION

In view of the foregoing, the invention is to provide a separator capable of withstanding high temperature, a manufacturing method thereof, and an electricity element using the separator.

To achieve the above, the invention discloses a method of manufacturing a separator. The method includes the following steps of: mixing a first material with a second material; solidifying the first material and the second material; removing the first material by an alkaline liquid etching process to form an separator body, so that the separator body has a plurality of irregular holes formed corresponding to the removed first material; and forming a first film on a first side of the separator body.

In addition, the invention also discloses a separator including a separator body and a first film. The separator body is formed by mixing and solidifying a first material and a second material and then removing the first material by an alkaline liquid etching process, so that the separator body has a plurality of irregular holes formed corresponding to the removed first material. The first film is disposed on a first side of the separator body.

Moreover, the invention further discloses an electricity element including a separator, a first current collecting layer, a second current collecting layer, a first active material layer, a second active material layer and a package unit. The separator includes a separator body and a first film. The separator body is formed by mixing and solidifying a first material and a second material and then removing the first material by an alkaline liquid etching process, so that the separator body has a plurality of irregular holes formed corresponding to the removed first material. The first separator film is disposed on a first side of the separator body. The first current collecting layer is disposed on a first side of the separator, and the second current collecting layer is disposed on a second side of the separator. The first active material layer is interposed between the separator and the first current collecting layer, and the second active material layer is interposed between the separator and the second current collecting layer. The package unit encapsulates a structure formed by the separator, first current collecting layer, second current collecting layer, first active material layer and second active material layer.

As mentioned above, the separator body of the invention is formed by mixing and solidifying the first material and the second material and then removing the first material by the alkaline liquid etching process. Then, the film is disposed on one side or two sides of the separator body so that the separator according to the invention is formed. Compared with the prior art, the invention makes the separator body of the separator have the capability of withstanding the higher temperature according to the physical property of the selected polyimide, and makes the separator body form the structure of the irregular holes by the alkaline liquid etching process. Thus, the additional manufacturing process for forming the micro holes on the separator body is not needed. In addition, the invention can form more holes, which are uniform and smaller, on the separator, and the separator body can have larger surface area for facilitating the film(s) to be adhered on the separator body. Accordingly, the manufacturing efficiency can be increased, and the electricity element using the separator of the invention may have higher thermal stability and security.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
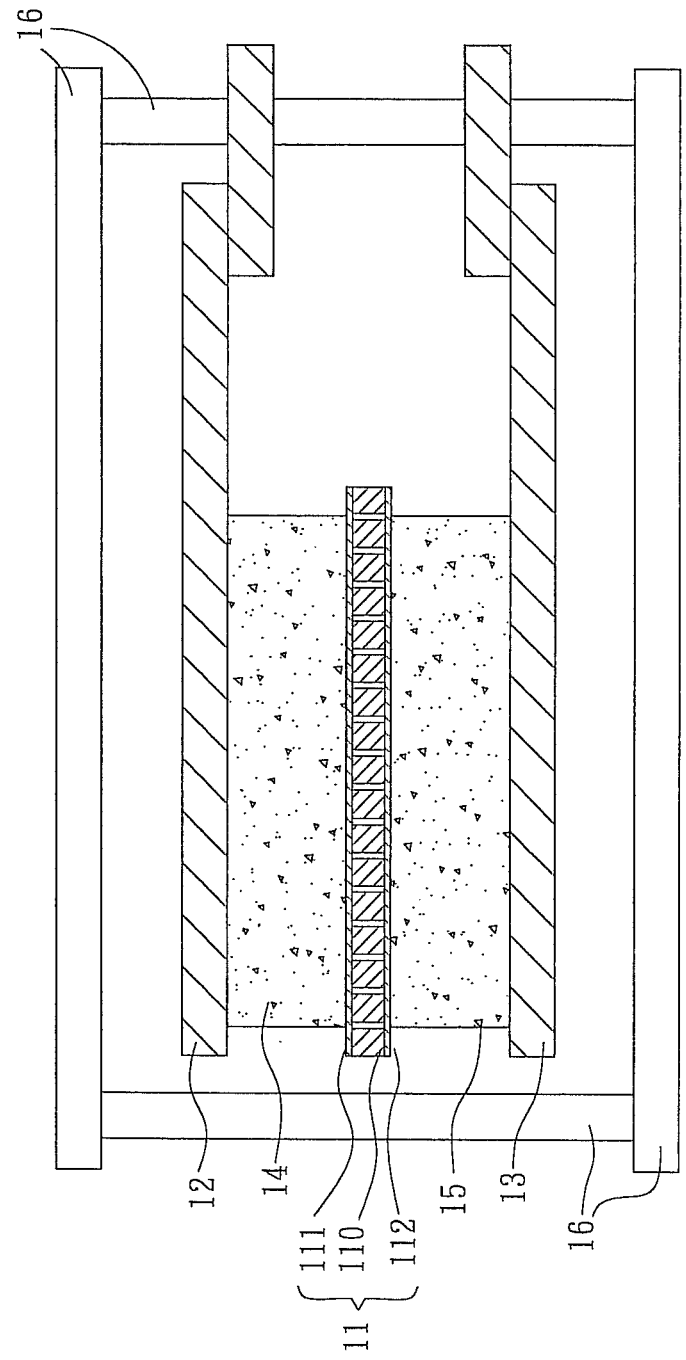
FIG. 1 is a schematic illustration showing a structure of an conventional electricity element.
Figure 2:
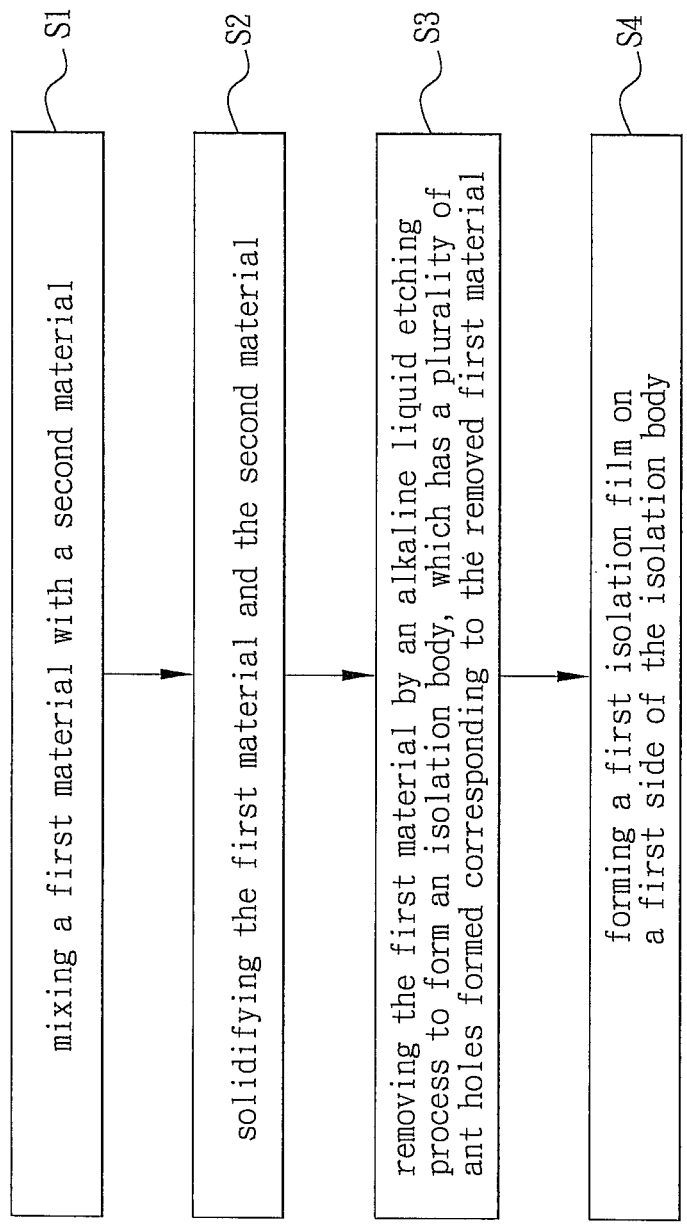
FIG. 2 is a flow chart showing a manufacturing method of a separator according to a preferred embodiment of the invention.
Figure 3A:
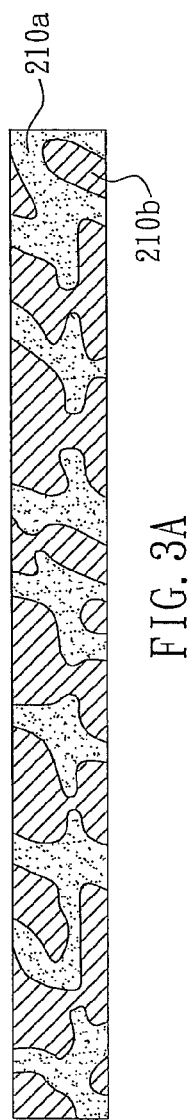
FIGS. 3A to 3C are schematic illustrations showing structures of the separator corresponding to various manufacturing steps according to the preferred embodiment of the invention.

Referring to FIG. 2, a manufacturing method of a separator according to a preferred embodiment of the invention includes the following steps S1 to S4. As shown in FIGS. 2 and 3A, a first material 210a and a second material 210b are mixed with each other in the step S1. In the step S2, the first material 210a and the second material 210b are solidified. In the embodiment, each of the first material 210a and the second material 210b is a precursor polymer of polyimide (PI), which is high temperature resistant, such as polyamic acid (PAA) or any derivation of PAA. In addition, although the first material 210a and the second material 210b both include polyamic acid (PAA), the number of basophilic groups in the first material 210a is greater than that in the second material 210b. Alternatively, the steric hindrance of the backbone and the side chain of the first material 210a is smaller or less than that of the second material 210b. Thus, the first material 210a is more active with an alkaline liquid than the second material 210b. Then, after the first material 210a is mixed with the second material 210b, the solvents of the first material 210a and the second material 210b are usually removed first, and then the first material 210a and the second material 210b are cyclized at high temperature. Thus, PAA or the derivation of PAA can form the polyimide or the same type of derivative polymer, which can withstand high temperature (higher than 200° C.). This is the material of the separator body of the invention, which has the cross-sectional structure as shown in FIG. 3A.

Figure 3B:
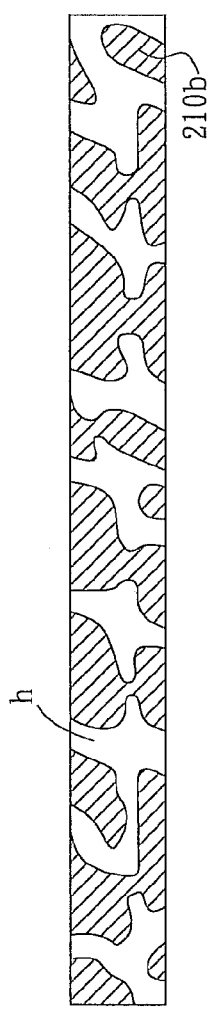

Next, as shown in FIGS. 2 and 3B, the first material 210a is removed by an alkaline liquid etching process to form a separator body 210 in the step S3. The separator body 210 has a plurality of irregular holes h formed corresponding to the removed first material 210a. Even if the polyimide is formed after the high-temperature cyclization, the dissolvability of the alkaline liquid with respect to the chemical polymeric materials of the first material 210a and the second material 210b still have great differences due to the numbers of the basophilic groups of the precursor polymer (polyamic acid) and the steric hindrance of the backbone and the side chain of the chemical polymeric material. Thus, the alkaline liquid etching process may be utilized to etch and remove the first material 210a. After the etching process, the locations where the first material 210a is removed form the irregular holes h. Therefore, an additional process for forming the micro holes on the separator body 210 is not needed.

Figure 3C:
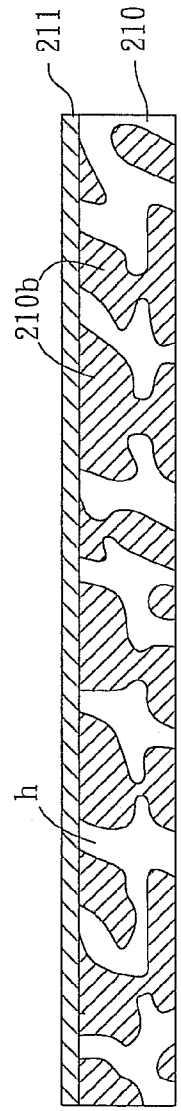

As shown in FIGS. 2 and 3C, a first film 211 is formed on a first side of the separator body 210 in the step S4. In this embodiment, the first film 211 is formed by way of single-side coating or dipping. The material of the first film 211 is the polymer formed by mixing a ceramic material with a polymeric material, wherein the ratio of the ceramic material in the polymer is greater than or equal to 20%. In addition, the ceramic material may be aluminum oxide ($Al_2O_3$), zinc oxide (ZnO), titanium dioxide ($TiO_2$), silicon dioxide ($SiO_2$) or alkyl silicon dioxide (fumed silica). The polymeric material may be polyimide (P), polyvinylidene fluoride (PVDF) or a derivation or a copolymer of PVDF, a mixture containing PVDF, or their polymer blend. Heretofore, the manufacturing process of a separator 21 of the invention is completed. Due to the material properties of the separator body 210 and the first film 211, the separator 21 of the invention substantially becomes incompressible but flexible and bendable. Thus, the utility of the separator 21 of the invention can be enhanced so that the separator 21 can be applied to the flexible electronic product.

Figure 4:
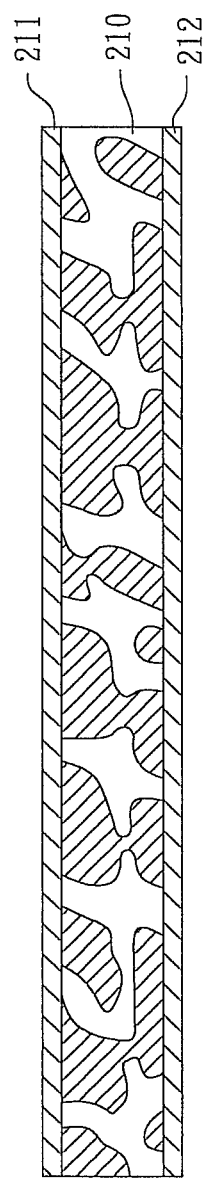
FIG. 4 is a schematic illustration showing another aspect of the separator according to the preferred embodiment of the invention.

As shown in FIG. 4, a separator 21' according to the embodiment of the invention is provided. The different between the separators 21 and 21' is in that the separator 21' further has a second film 212 formed on a second side of the separator body 210, and the separator body 210 is interposed between the first film 211 and the second film 212. The second film 212 and the first film 211 are made of the same material, so detailed descriptions thereof will be omitted. In addition, the first film 211 and the second film 212 may be respectively formed on two sides of the separator body 210 by way of single-side coating, or may be simultaneously formed on the two sides of the separator body 210 by way of dual-side coating or dipping according to the precendential consideration of lower cost and higher efficiency.

Alternatively, the separator of the invention can be composed of only the separator body 210 as shown in FIG. 3B. In this case, the irregular holes h of the separator body 210 should be small enough to block electrons and to allow ions to pass through. The separator body 210 is illustrated herein above, so the detailed description will be omitted here for concise purpose.

Figure 5:
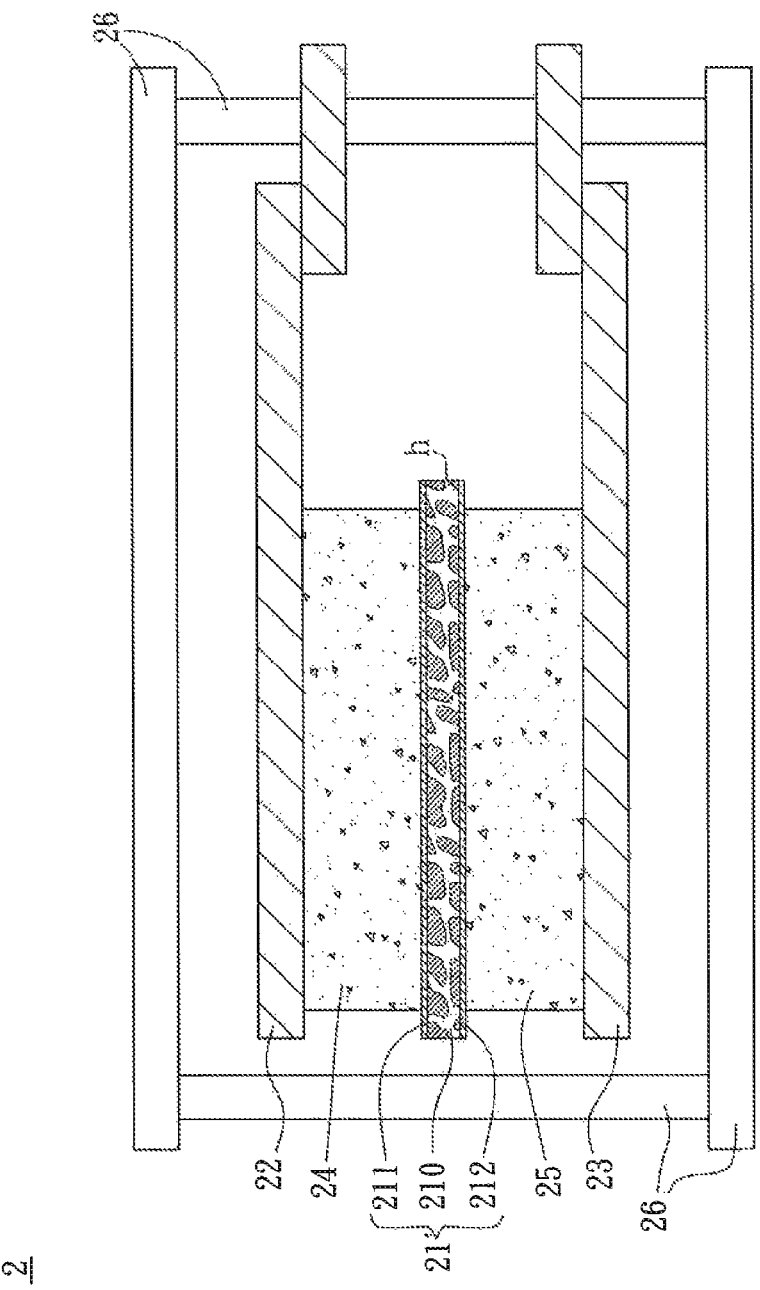
FIG. 5 is a schematic illustration showing a structure of an electricity element according to the preferred embodiment of the invention.

As shown in FIG. 5, an electricity element 2 according to the preferred embodiment of the invention includes the separator 21' of FIG. 4. The electricity element 2 includes the separator 21', a first current collecting layer 22, a second current collecting layer 23, a first active material layer 24, a second active material layer 25 and a package unit 26.

The separator 21' includes a separator body 210, a first film 211 and a second film 212. The separator body 210 is formed by mixing and solidifying a first material 210a and a second material 210b, and removing the first material 210a by an alkaline liquid etching process. The separator body 210 is formed with a plurality of irregular holes h corresponding to the removed first material 210a. The first film 211 is disposed on one side of the separator body 210, while the second film 212 is disposed on the other side of the separator body 210. The separator body 210 is interposed between the first film 211 and the second film 212. The manufacturing method and the material of the separator 21' have been described in the above embodiment corresponding to FIGS. 2, 3A to 3C and 4, so detailed descriptions thereof will be omitted. Of course, the separator 21' may also be replaced with the separator 21 in the electricity element 2. Although the separator 21 only has one film (i.e., the first film 211), the corresponding structure of the irregular holes of the separator body 210 still can isolate the electric power as well as maintaining the ionic electroconductive property. Thus, the electricity element 2 can be prevented from generating the inner shorting condition, which influences the quality of the electric energy, and can keep its optimum ionic electroconductive ability.

The first current collecting layer 22 is disposed on one side of the separator 21', and the second current collecting layer 23 is disposed on the other side of the separator 21'. The material of each of the first current collecting layer 22 and the second current collecting layer 23 may be, for example, metal including copper, aluminum, nickel, tin, silver or gold, or an metal alloy. The first active material layer 24 is interposed between the separator 21' and the first current collecting layer 22, while the second active material layer 25 is interposed between the separator 21' and the second current collecting layer 23. The package unit 26 encapsulates the structure formed by the separator 21', the first current collecting layer 22, the second current collecting layer 23, the first active material layer 24 and the second active material layer 25.

In addition, the electricity element 2 may be an electricity supply element, such as a battery element, or an electricity storage element, such as a capacitor element or an ultra capacitor. In this case, the first current collecting layer 22 and the first active material layer 24 can construct a first electrode substrate of the electricity supply element, and the second current collecting layer 23 and the second active material layer 25 can construct the second electrode substrate of the electricity supply element.

The irregular holes h formed on the separator body 210 of the separator 21'mainly function as an electron insulating layer and an ion conductive layer for the first electrode substrate (including the first current collecting layer 22 and the first active material layer 24) and the second electrode substrate (including the second current collecting layer 23 and the second active material layer 25). Meanwhile, in order to prevent the opening structure from causing the micro-short-circuited state and prevent the too great loading of the local electrode active region from aging the first active material layer 24 too quickly, a first film 211 and a second film 212 have to be disposed over the irregular holes h. The first film 211 and the second film 212 can function to avoid the above-mentioned problem and also to enhance the adhesive forces between the separator body 210 of the corresponding separator 21' and the first and second active material layers 24 and 25.

The separator body 210, the first film 211 and the second film 212 of the separator 21' of the invention are made of high-temperature resistant materials such that the separator can withstand the temperature higher than 200° C. Therefore, the electricity element 2 with the added separator 21' of the invention can have improved stability and security as compared with the prior art.

In addition, since the separator can be composed of only the separator body 210, the electricity element 2 can also function without the first film 211 and the second film 212.

In summary, the separator body of the invention is formed by mixing and solidifying the first material and the second material and then removing the first material by the alkaline liquid etching process. Then, the film is disposed on one side or two sides of the separator body so that the separator according to the invention is formed. Compared with the prior art, the invention makes the separator body of the separator have the capability of withstanding the higher temperature according to the physical property of the selected polyimide, and makes the separator body form the structure of the irregular holes by the alkaline liquid etching process. Thus, the additional manufacturing process for forming the micro holes on the separator body is not needed, so that the manufacturing efficiency can be increased. In addition, the level of the open structure is controlled according to the ratios of the ceramic material in the first film and the second film, the sizes of the particles and the distributions of the particles. Meanwhile, either the film or the separator body has excellent physical properties, such as the high-temperature resistant, flexible and incompressible properties. Thus, the electricity element using the separator of the invention may have higher thermal stability and security.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of manufacturing a separator, comprising the steps of:
    mixing a first material with a second material;
    solidifying the first material and the second material;
    removing the first material by an alkaline liquid etching process to form a separator body, so that the separator body has a plurality of irregular holes formed corresponding to the removed first material; and
    forming a first film on a first side of the separator body, wherein the step of solidifying the first material and the second material comprises:
    removing at least one of solvents of the first material and the second material; and
    cyclizing the first material and the second material, wherein each of the first material and the second material is a precursor polymer of polyimide, and the number of basophilic groups of the first material is greater than the number of basophilic groups of the second material.

2. The method according to claim 1, further comprising the step of:
    forming a second film on a second side of the separator body, wherein the separator body is interposed between the first film and the second film.

3. The method according to claim 2, wherein the first film and the second film are formed by a coating method or a dipping method.

4. The method according to claim 3, wherein the coating method is a single-side coating method or a dual-side coating method.

5. The method according to claim 2, wherein a material of each of the first film and the second film is a mixture.

6. The method according to claim 5, wherein the mixture comprises a ceramic material and a polymer material.

7. The method according to claim 6, wherein the polymer material comprises polyimide, polyvinylidene fluoride (PVDF), a copolymer of PVDF, or a mixture containing PVDF.

8. The method according to claim 1, wherein the first material is more active with the alkaline liquid than the second material.

9. The method according to claim 8, wherein a steric hindrance of the backbone and the side chain of the first material is smaller or less than that of the second material.

10. The method according to claim 1, wherein the precursor polymer comprises polyamic acid.

\* \* \* \* \*